US009891423B2

United States Patent
Kues et al.

(10) Patent No.: US 9,891,423 B2
(45) Date of Patent: Feb. 13, 2018

(54) METHOD FOR THE CORRECTION OF SPHERICAL ABERRATION IN MICROSCOPIC APPLICATIONS

(71) Applicant: Carl Zeiss Microscopy GmbH, Jena (DE)

(72) Inventors: Thorsten Kues, Bovenden-Eddigehausen (DE); Ralf Steinmeyer, Hannover (DE)

(73) Assignee: Carl Zeiss Microscopy GmbH, Jena (DE)

( * ) Notice: Subject to any disclaimer, the term of this patent is extended or adjusted under 35 U.S.C. 154(b) by 501 days.

(21) Appl. No.: 14/617,094

(22) Filed: Feb. 9, 2015

(65) Prior Publication Data

US 2015/0253562 A1    Sep. 10, 2015

(30) Foreign Application Priority Data

Mar. 4, 2014  (DE) .................. 10 2014 003 145

(51) Int. Cl.
*G02B 27/00* (2006.01)
*G02B 21/36* (2006.01)
*H04N 5/238* (2006.01)

(52) U.S. Cl.
CPC ......... *G02B 21/367* (2013.01); *G02B 21/361* (2013.01); *G02B 27/0025* (2013.01); *H04N 5/238* (2013.01)

(58) Field of Classification Search
CPC  G02B 21/367; G02B 21/361; G02B 27/0025; H04N 5/238
See application file for complete search history.

(56) References Cited

U.S. PATENT DOCUMENTS

| 6,473,228 | B1 | 10/2002 | Toshimitsu | |
|---|---|---|---|---|
| 9,509,986 | B2 * | 11/2016 | Chang | H04N 17/002 |
| 2005/0024718 | A1 * | 2/2005 | Sase | G02B 27/0025 359/368 |
| 2006/0164949 | A1 * | 7/2006 | Sagara | G11B 7/0908 369/106 |

(Continued)

FOREIGN PATENT DOCUMENTS

WO    WO2005/096062    10/2005

OTHER PUBLICATIONS

German Search Report for German Application No. DE 10 2014 003 145.4, dated Mar. 27, 2014. English translation provided.

*Primary Examiner* — Christopher Findley
(74) *Attorney, Agent, or Firm* — Patterson Thuente Pederson, P.A.

(57) ABSTRACT

A procedure for the correction of spherical aberration in microscopic applications, wherein various recordings of a specimen to be observed are taken and evaluated for the purpose of changing the setting values of the optical system. The correction values are stored in a correction matrix as a function of the recording position, the recording time, the wavelength, and the temperature, wherein the determination and storage of the correction values are carried out in each recording position in the x, y, and z coordinates, and/or the correction values are determined after a selection of grid points by interpolation, so that the correction values of the interpolated correction matrix are the starting values for the subsequent exact determination by measurement.

9 Claims, 1 Drawing Sheet

(56) References Cited

U.S. PATENT DOCUMENTS

| | | | |
|---|---|---|---|
| 2007/0064552 A1* | 3/2007 | Kurokawa | G11B 7/0945 369/44.23 |
| 2007/0115457 A1* | 5/2007 | Matsuzawa | G01M 11/0264 356/124 |
| 2008/0074973 A1* | 3/2008 | Nishino | G11B 7/13925 369/53.15 |
| 2011/0075529 A1* | 3/2011 | Shimamoto | G11B 7/08511 369/44.32 |
| 2011/0102572 A1* | 5/2011 | Kihara | G02B 21/244 348/79 |
| 2013/0250144 A1* | 9/2013 | Takayama | H04N 5/265 348/239 |
| 2015/0153559 A1* | 6/2015 | Sato | G02B 21/367 348/79 |

* cited by examiner

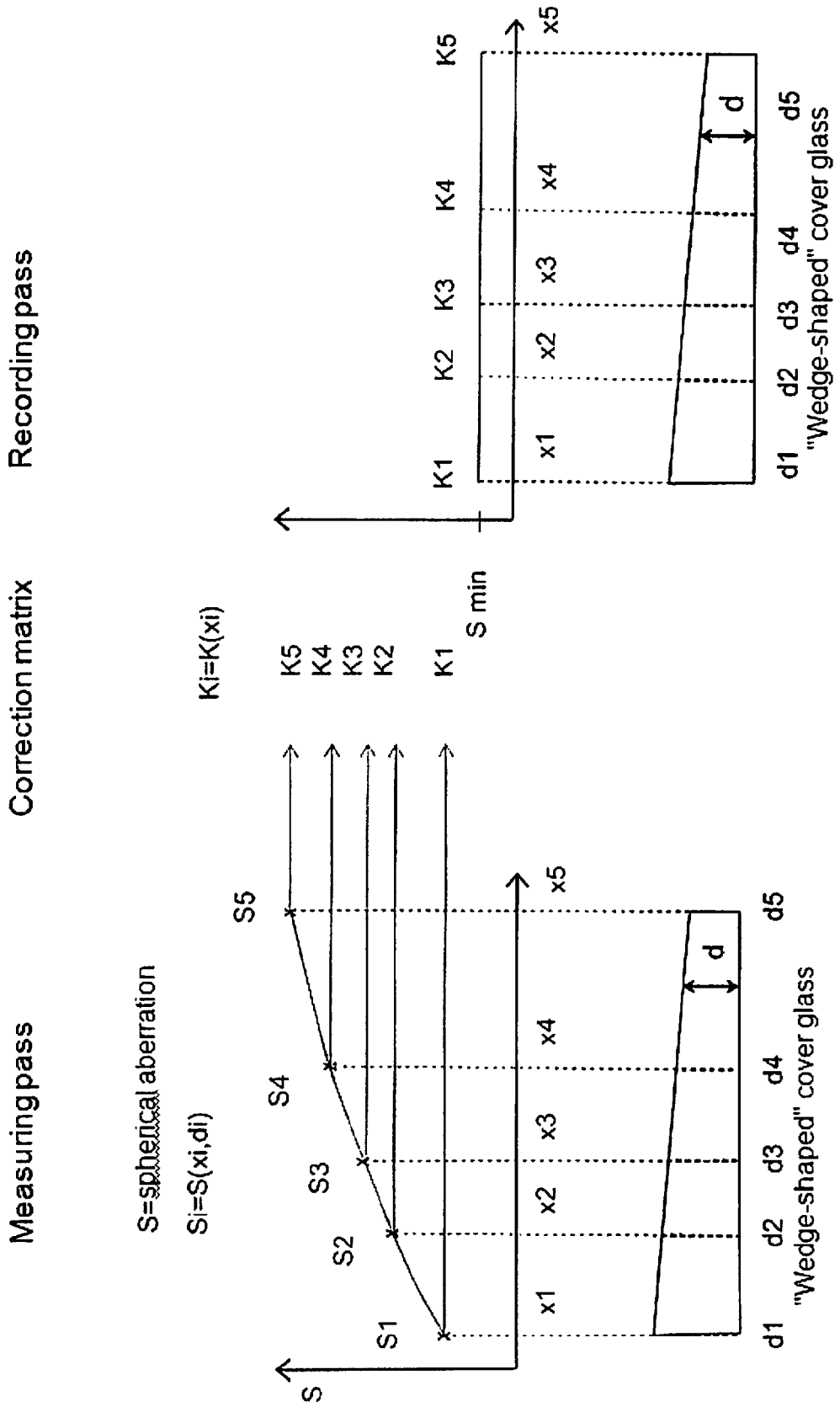

METHOD FOR THE CORRECTION OF SPHERICAL ABERRATION IN MICROSCOPIC APPLICATIONS

RELATED APPLICATION

The present application claims priority to German Application No. 10 2014 103 145.4 filed Mar. 4, 2014, said priority application being incorporated herein in its entirety by reference.

FIELD OF THE INVENTION

The invention relates to a procedure for correction of spherical aberration in microscopic applications, and in particular, wherein various recordings of a specimen to be observed are taken and evaluated for the purpose of changing setting values of an optical system.

BACKGROUND OF THE INVENTION

Approaches are known in light microscopy, in particular in high-resolution microscope systems for biomedical applications, in which spherical aberration is corrected in an automated manner.

The reason for the occurrence of spherical aberration is that vessel bottoms have locally fluctuating thicknesses and/or indices of refraction. In addition, locally fluctuating thicknesses and indices of refraction occur due to the structure and composition of the biological preparations. The locally varying optical path length which results leads to locally varying spherical aberration.

It is known that the spherical aberration may be influenced by using correcting objectives. If the image recording takes place only at one or a few positions, manual correction of the spherical aberration may still be acceptable. However, as soon as z-stack, multiposition, panoramic, and/or time series experiments are carried out in multiple fluorescence channels, for example, manual adjustment is no longer practicable.

Determining the correction of the spherical aberration generally requires multiple micrograph recordings, depending on the type of correction procedure. The numerous recordings not only require more time, but also mean a high phototoxicity level in the specimens to be investigated. In fluorescence imaging, this means increased bleaching of the specimen. In living cell applications, this results in undesired stress on the specimen.

The measurement and correction of the spherical aberration may take approximately 0.5 to 5 seconds, depending on the method and recording mode, such as fluorescence or transmitted light. In experiments in which a large number of recordings is carried out, this results in a significant increase in examination time, and a limitation of the achievable time resolution.

Thus, for example, scanning a 96-well plate with only one image per well would take an additional 8 minutes per pass, resulting in a significant limitation of the achievable time resolution. The time expenditure for correcting the spherical aberration may exceed the duration of the actual image recording.

Creating an overview recording (panoramic recording) by placing individual recordings in sequence, in combination with a correction of the spherical aberration, likewise requires a time expenditure of approximately 0.5 to 5 seconds per image. For an overview image composed of 20×20 images, this would add up to approximately 3 to 30 minutes.

Depending on the application and/or specimen, the spherical aberration may vary over time, for example due to morphological changes in the specimen. In combined time series/multiposition experiments, this requires a redetermination of the correction values prior to each individual recording. In the process, the initial values for correcting the spherical aberration may become increasingly farther from the instantaneous optimal correction values. In the best case, the correction algorithm then only requires more time. Depending on the correction procedure, it is also possible that no optimum for the correction is found. In such a case, the correction value must be estimated, for example in the form of the suboptimal initial value.

The spherical aberration is also a function of the wavelength. This is important in particular in multichannel fluorescence applications. To achieve an optimal correction of the spherical aberration, a correction must be made not only at each individual position, but also in each individual fluorescence channel, so that the number of recordings and the phototoxicity are increased by the corresponding factor.

In addition, the spherical aberration is a function of the focus position. Thus, in the recording of three-dimensional data records such as z-stacks, the spherical aberration generally changes with increasing penetration depth into the preparation. For each z position there is then an optimal value for the correction. Optimal image quality is achieved by an appropriate adaptive adjustment of the correction to the specimen depth. Here as well, numerous time-consuming image recordings are necessary for measuring the spherical aberration and determining the correction value.

In particular in combination with multiposition and time series experiments, this results in an unacceptable time resolution and phototoxic stress on the specimen.

Determining the correction of the spherical aberration from the preparation based on the image content requires that suitable structures are present in the images, which due to their properties such as contrast and form factor also allow a correction. This is not necessarily the case, in particular for fluorescent markers, which generally are very heterogeneous. An optimal correction would then not be possible.

US 2002/0097406 describes methods and systems for monitoring the fabrication of a semiconductor, wherein specimen properties such as specimen thickness and at least one additional parameter are measured. The determined data are stored by a computer unit. After analysis of the defects in the specimen, the positions are stored in the computer unit. The fabrication process is influenced based on these defects. The specimen occasionally alternates between two different devices, with only the surface of the specimen being evaluated.

US 2003/0103662 describes methods for automated microscopy, in which the re-imaging of positions in the x and y directions is carried out in particular in multiwells with the assistance of reference marks, and sometimes also by image comparison. Furthermore, US 2010/0172020 describes a method for determining longitudinal defects of a specimen, making use of the chromatic aberration; however, a spatial dependency is not considered.

Proceeding from the disadvantages of the approaches according to the prior art, the object of the invention is to refine a procedure for the correction of the spherical aberration with microscopic applications in such a way that the number of necessary recordings required for a correction in multichannel, multiposition, three-dimensional, and/or panoramic experiments, for example, is minimized, thus improving the reproducibility even for spherical aberration which varies over time.

This object is achieved according to embodiments of the invention by a procedure of the type described herein. In an embodiment, correction values are stored in a correction matrix (assignment table) as a function of the recording position, the recording time, and the wavelength, wherein the determination and storage of the correction values are carried out in each recording position in the x, y, and z coordinates, and/or the correction values are determined after a selection of grid points by interpolation, so that the correction values of the interpolated correction matrix are the starting values for the subsequent exact determination by measurement. Another variant is to directly use the interpolated value.

The change in the setting values (experimental parameters and correction values) is advantageously controlled via motor drives and/or an electronic circuit and/or optical actuators. In the process, the spherical aberration is individually measured and corrected at each recording position.

An individual average value is advantageously determined at each grid point for all wavelengths used. In many applications, it is generally not necessary to readjust the correction of the spherical aberration over time. Once the correction is determined at the respective recording positions in the x, y, and z coordinates, these coordinates may be stored, and retrieved as needed.

The correction of spherical aberration advantageously takes place according to the following algorithm:
  approaching a first position;
  determining the necessary correction;
  storing the spherical aberration and the correction values in combination with the x, y, and z coordinates of the first position;
  optionally approaching further positions; and determining the appropriate corrections; and
  storing the spherical aberration and the correction values in combination with the x, y, and z coordinates of the second position, and so forth;
starting an experiment by:
  approaching the first position;
  retrieving the stored correction factor for the first position;
  making the necessary adjustments for correcting the spherical aberration, for example by turning a correction ring;
  recording a first image;
  optionally approaching further positions;
  retrieving stored correction factors for these positions; and
  making the necessary adjustments for correcting the spherical aberration, and so forth.

If a constant time interval between the recordings is not necessary, the first image recording of the experiment may take place in the correction pass, in each case after determining the needed correction by means of a suitable correction procedure.

In particular in the recording of large overview images, it is helpful when the measurement of the spherical aberration and the determination of the correction values do not have to be carried out by measuring each individual image. The procedure according to the invention allows the correction without measuring at each individual position. For this purpose, the correction matrix is interpolated after the correction values have been determined at defined grid points in the x, y, and z coordinates.

Such a reduction of the correction determination to defined grid points advantageously takes place using the following algorithm:
Carrying out at least two correction passes by:
  defining grid points by the user or automatically, for example from an automatically recognized specimen area or using a region of interest which is determined by the user;
  approaching a first grid point;
  determining the correction for the first position;
  storing the first correction value together with the x, y, and z coordinates of the first position in the correction matrix;
  approaching a second grid point;
  determining the correction for the second position;
  storing the second correction value together with the x, y, and z coordinates of the second position in the correction matrix; and
  interpolating the overall correction matrix from the grid point values, and so forth;
starting an experiment in at least two positions, by:
  approaching the first position;
  retrieving the correction factor from the interpolated correction matrix for the first position;
  making the necessary adjustments for correcting the spherical aberration;
  recording a first individual image;
  approaching the second position;
  retrieving the correction factor from the interpolated correction matrix for the second position;
  making the necessary adjustments for correcting the spherical aberration; and
  recording a second individual image, and so forth.

In this way it is possible to minimize the time requirements and phototoxicity and maximize the time resolution.

If the accuracy of the interpolated correction values is not sufficient for the application, the values from the interpolated correction matrix may advantageously be used as starting values for the correction passes. The starting values are then very close to the optimal values. The number of recordings needed for the correction algorithm may be minimized in this way. This reduces the required time, increases the time resolution, and minimizes the phototoxicity of the overall correction procedure. By processing the positions to be handled in a suitable sequence, the network of grid points which are already known may be refined step by step, so that the interpolation becomes increasingly more accurate.

The structure of living preparations, for example Drosophila embryos or cells on a cover glass, changes over time. In the process, the spherical aberration may also locally change. In order to optimize the speed of the correction and to minimize phototoxicity to the greatest extent possible, the correction values determined in the respective preceding pass may be used as starting values. This allows optimal image quality, even for specimens which vary over time.

In addition, in the event of spherical aberration in the z-stacks which varies in the preparation in the axial direction, it is advantageous to retrieve the correction matrix at an identical lateral position and use it for the image recording, wherein, depending on the experiment, test recordings are made at different times in order to determine changes in the spherical aberration and in the detection over time.

If no change is identified, the existing correction matrix for the z-stack may be used. If the spherical aberration changes over time, a new correction pass may be started. This likewise allows continuous tracking of the correction, and optimal image quality, even for specimens which vary over time in three dimensions.

Depending on the structure of the specimen and the support, as well as the correction options in the objective, it is also conceivable to analogously optimize the correction of other image errors, such as longitudinal chromatic aberration and wavelength-dependent magnification, also in combination. The prerequisite in each case is the capability for adjusting the error in question, which may be carried out by electronic control.

The procedure according to embodiments of the invention allows a rapid, very accurate, and reproducible correction of the spherical aberration in microscopic applications.

The procedure is explained in greater detail below with reference to exemplary embodiments.

BRIEF DESCRIPTION OF THE DRAWINGS

FIG. 1 depicts a one-dimensional illustration of a measuring pass, a correction matrix, and a recording pass.

DETAILED DESCRIPTION

Spherical aberration is a function of a plurality of parameters. In a typical experiment, the spherical aberration is determined by the position x, y, and z, the wavelength $\lambda$, the cover glass thickness d, the index of refraction n1 of the cover glass, the index of refraction n2 of a specimen, and the penetration depth 1 into the specimen, resulting in the following dependencies:

$$S_{ijk}=S(x_i,y_i,z_k,\lambda_{ij},l_{ik},d_i,n1_i,n2_i,\ldots),$$

where i is the index for the particular measuring/recording position, j is the index for the particular wavelength, and k is the index for the axial position, for example within a z-stack. The exact determination and correction of the spherical aberration and the setting of the correction matrix are dependent on the correction procedure used.

In a first example, the correction is described using a correcting objective by turning a correction ring. In this case, the position of the correction ring corresponds to a spherical aberration to be corrected. Thus, there is an association between the setting value of the correction ring and the spherical aberration, which is thus corrected.

In this case, the correction matrix is composed of the association of the correction ring positions with the particular recording parameters:

$$K_{ijk}=K(x_i,y_i,z_k,\lambda_{ij},l_{ik},d_i,n1_i,n2_i,\ldots)$$

In another example, recordings are to be made of a simple microscopic specimen. The specimen is covered with a cover glass whose actual thickness, however, is generally not known, and which also locally fluctuates. For high-quality recordings, in particular using high numerical aperture air objectives, the cover glass thickness d should be determined in order to be able to appropriately correct the spherical aberration which occurs, for example by using a correction ring on the objective.

For simplification, FIG. 1 a one-dimensional illustration; i.e., the thickness d of the cover glass changes only in the x direction. All other parameters are to be regarded as constant. Different spherical aberration errors result from the different cover glass thicknesses d1 through d5, as a function of the x position. These errors may be measured at defined positions in a measuring pass and stored.

In the case of a correcting objective, the correction matrix directly results as a simple association of the ring positions with the corresponding x positions, and thus, with the corresponding cover glass thicknesses d1 through d5. This correction matrix may then be retrieved in a subsequent recording pass and used for the correction; i.e., the correction ring positions K1 through K5 are read from the correction matrix at the different x positions x1 through x5, respectively, and adjusted. The resulting spherical aberration error is thus minimized or even eliminated.

This correction matrix may also be used for interpolating correction values between the measuring positions.

In the simplest case, a correction value $K_6$ (not illustrated) may be determined by at a position $x_6$ (likewise not illustrated), where $x_4<x_6<x_5$, by linear interpolation as follows:

$$K_6=K_4+(x_6-x_4)*(K_5-K_4)(x_5-x_4).$$

Alternative procedures, also for multidimensional interpolation with a greater number of grid points, are likewise possible. The correction values determined by interpolation may be used for storing same in a derived correction matrix.

What is claimed is:

1. A method for correcting spherical aberration in a microscope, wherein recordings of a specimen to be observed are taken at each of a plurality of recording positions, wherein spherical aberration correction values are determined for each recording position, the spherical aberration correction values being stored in a correction matrix as a function of recording position, recording time, wavelength, and temperature, wherein the determination and storage of the correction values are carried out in each recording position in x, y, and z coordinates, or the correction values are determined after a selection of grid points by interpolation, so that the correction values of the interpolated correction matrix are the starting values for the subsequent exact determination by measurement.

2. The method for correction of spherical aberration of claim 1, wherein the change in the setting values (experimental parameters and correction values) is controlled via motor drives, an electronic circuit, or optical actuators.

3. The method for correction of spherical aberration of claim 1, wherein spherical aberration is individually measured and corrected at each recording position.

4. The method for correction of spherical aberration of claim 1, wherein an individual average value is determined at each grid point for all wavelengths used.

5. The method for correction of spherical aberration of claim 1, including the following steps:
   approaching a first position;
   determining first spherical aberration correction values for the first position;
   storing the first spherical aberration correction values in combination with the x, y, and z coordinates of the first position;
   approaching at least a second position;
   determining second spherical aberration correction values for the second position; and
   storing the second spherical aberration and the correction values in combination with the x, y, and z coordinates of the second position;
   starting an experiment by:
   approaching the first position;
   retrieving the stored first spherical aberration correction values;
   adjusting the microscope to correct spherical aberration at the first position;
   recording a first image;
   approaching the second position;

retrieving the stored second spherical aberration correction values;
adjusting the microscope to correct spherical aberration at the second position; and
recording a second image.

6. The method for correction of spherical aberration of claim 1, including the following steps:
carrying out at least two correction passes by:
defining a plurality of grid points;
approaching a first one of the grid points defining a first position;
determining the spherical aberration correction for the first position;
storing first spherical aberration correction values together with x, y, and z coordinates of the first position in the correction matrix;
approaching a second one of the grid points defining a second position;
determining the spherical aberration correction for the second position;
storing the second spherical aberration correction values together with x, y, and z coordinates of the second position in the correction matrix;
interpolating an overall correction matrix from the first spherical aberration correction values and the second sperhical aberration correction values for a plurality of other grid points;
starting an experiment involving least two positions by:
approaching the first position;
retrieving the first spherical aberration correction values from the correction matrix;
adjusting the microscope to correct spherical aberration based on the first spherical aberration correction values;
recording a first image at the first position;
approaching the second position;
retrieving the second spherical aberration correction values from the correction matrix;
adjusting the microscope to correct spherical aberration based on the second spherical aberration correction values; and
recording a second image at the second position.

7. The method for correction of spherical aberration of claim 6, wherein correction factors from the interpolated correction matrix are used as starting values for the correction passes.

8. The method for correction of spherical aberration of claim 7, wherein determined values from the at least two exact correction passes are used as new values for the grid points of the correction matrix.

9. The method for correction of spherical aberration of claim 1, wherein in the event of spherical aberration in a z-stack which varies in an axial direction, the correction matrix at an identical lateral position is retrieved and used for image recording, wherein, depending on an experiment, test recordings are made at different times in order to determine changes in spherical aberration over time.

* * * * *